(12) United States Patent
Harrison et al.

(10) Patent No.: US 11,280,930 B2
(45) Date of Patent: Mar. 22, 2022

(54) SENSOR FOR DETECTING THE CONTENTS OF A BORE

(71) Applicant: Salunda Limited, Oxfordshire (GB)

(72) Inventors: Martin Roy Harrison, Oxfordshire (GB); Alan Patrick John Finlay, Hereford and Worcester (GB)

(73) Assignee: Salunda Limited, Oxfordshire (GB)

( * ) Notice: Subject to any disclaimer, the term of this patent is extended or adjusted under 35 U.S.C. 154(b) by 116 days.

(21) Appl. No.: 16/491,387

(22) PCT Filed: Mar. 6, 2018

(86) PCT No.: PCT/GB2018/050564
§ 371 (c)(1),
(2) Date: Sep. 5, 2019

(87) PCT Pub. No.: WO2018/167461
PCT Pub. Date: Sep. 20, 2018

(65) Prior Publication Data
US 2020/0018867 A1 Jan. 16, 2020

(30) Foreign Application Priority Data
Mar. 14, 2017 (GB) .................................. 1704062

(51) Int. Cl.
*G01V 3/28* (2006.01)
*G01V 3/10* (2006.01)
*E21B 47/092* (2012.01)

(52) U.S. Cl.
CPC .............. *G01V 3/28* (2013.01); *E21B 47/092* (2020.05); *G01V 3/107* (2013.01)

(58) Field of Classification Search
CPC ....... H01L 21/00; H01L 2221/00; G01K 1/00; G01K 2201/00; E21B 1/00; E21B 10/00
See application file for complete search history.

(56) References Cited

U.S. PATENT DOCUMENTS

| 3,103,976 A | 9/1963 | deVries et al. |
| 3,843,923 A | 10/1974 | deVries et al. |

(Continued)

FOREIGN PATENT DOCUMENTS

| EP | 2792843 A1 | 10/2014 |
| GB | 2490685 A | 11/2012 |

(Continued)

OTHER PUBLICATIONS

Andarawis, Intelligent BPO RAM Actuation Sensor System Presentation, RPSEA, Jun. 4, 2014.

(Continued)

*Primary Examiner* — Jermele M Hollington
*Assistant Examiner* — Temilade S Rhodes-Vivour
(74) *Attorney, Agent, or Firm* — Honigman LLP (57) ABSTRACT

A sensor system for sensing the contents of a bore including a plurality of coils disposed behind a non-metallic lining. An oscillator circuit may be used to drive the coils to generate oscillating electromagnetic fields, and a detection circuit generates output signals from each coil representing a parameter of the electrical oscillations that depends on the contents of the bore. The coils may include a primary coil and a one secondary coil, wherein the oscillating electromagnetic field generated by the secondary coil has a lesser degree of interaction with the contents of bore than the oscillating electromagnetic field generated by the primary coil. The sensor system may use the output signal from the secondary coil to compensate the output signal from the primary coil for environmental effects.

25 Claims, 5 Drawing Sheets

(56) References Cited

U.S. PATENT DOCUMENTS

| | | | |
|---|---|---|---|
| 5,682,099 A * | 10/1997 | Thompson | G01V 3/30 324/338 |
| 6,614,229 B1 * | 9/2003 | Clark | E21B 43/086 324/338 |
| 7,274,989 B2 | 9/2007 | Hopper | |
| 8,035,374 B1 | 10/2011 | Girrell et al. | |
| 9,259,168 B2 | 2/2016 | Marashdeh et al. | |
| 2003/0090269 A1 * | 5/2003 | Fanini | G01V 3/28 324/339 |
| 2004/0263158 A1 | 12/2004 | Biester et al. | |
| 2009/0039876 A1 | 2/2009 | Biester et al. | |
| 2010/0017137 A1 * | 1/2010 | Legendre | G01B 7/13 702/11 |
| 2010/0097374 A1 | 4/2010 | Fan et al. | |
| 2011/0057647 A1 | 3/2011 | Biester et al. | |
| 2012/0095686 A1 * | 4/2012 | Legendre | G01N 27/9073 702/6 |
| 2013/0002255 A1 | 1/2013 | Shampine | |
| 2013/0085365 A1 | 4/2013 | Marashdeh et al. | |
| 2014/0340089 A1 * | 11/2014 | Rodney | G01V 3/40 324/346 |
| 2015/0260550 A1 | 9/2015 | Harrison et al. | |
| 2016/0206227 A1 | 7/2016 | Marashdeh et al. | |
| 2016/0312603 A1 | 10/2016 | Gottlieb et al. | |

FOREIGN PATENT DOCUMENTS

| | | |
|---|---|---|
| WO | WO-2003050390 A1 | 6/2003 |
| WO | WO-2009147385 A2 | 12/2009 |
| WO | WO-2012007718 A2 | 1/2012 |
| WO | WO-2012153090 A2 | 11/2012 |
| WO | WO-2015015150 A1 | 2/2015 |
| WO | WO-2015145130 A1 | 10/2015 |
| WO | WO-2016130979 A1 | 8/2016 |
| WO | WO-2016174439 A1 | 11/2016 |
| WO | WO-2016176122 A1 | 11/2016 |

OTHER PUBLICATIONS

Andarawis, Intelligent BOP RAM Actuation Sensor System Report, RPSEA, Sep. 25, 2014.

* cited by examiner

SENSOR FOR DETECTING THE CONTENTS OF A BORE

TECHNICAL FIELD

The present invention relates to a sensor insert including sensing coils that may be inserted into a bore for sensing of the contents of the bore.

BACKGROUND

The present invention may be applied to a bore used in oil and gas extraction and production, wherein there are a wide range of situations sensing the contents of a bore is useful.

An example of such sensing in oil and gas extraction and production is to sense an elongate element such as a drill string or drill casing, in which case such sensing may be used to control a blow-out preventer (BOP). Various sensor systems for sensing the axial position along the bore of joint sections of a drill string in a well bore are known, many of these dating from the 1960s and 1970s when undersea drilling first became widespread. By way of example, each of U.S. Pat. Nos. 3,103,976, 3,843,923 and 7,274,989 disclose electromagnetic (EM) sensor systems for sensing the axial position of a joint section in a drill string.

Another example of such sensing is to sense the material properties of the contents of the bore. In oil and gas extraction and production, for example, there are a wide range of situations where it is advantageous to sense the EM properties of the contents of the bore, for example as discussed in WO-2012/007718, WO-2015/015150 and GB-2,490,685. In another example, WO-2012/153090 describes a fluid conduit fabricated from a composite material that incorporates sensors that sense the properties of the contents of the bore, in particular forming a cavity resonator packaged inside the fluid conduit.

WO-2016/174439 discloses a particular advantageous form of sensor system using a plurality of sensing coils arranged facing the bore for generating an EM field directed laterally into the bore. The sensor system may be arranged as an insert to be inserted into the bore, for example as a sealing insert, and provides for reliable and accurate sensing of the contents of the bore.

SUMMARY

The present invention relates to sensing using plural coils to generate oscillating electromagnetic fields in the bore and detecting a parameter of the electrical oscillations that depends on the contents of the bore. In this case there is a problem that environmental effects can affecting the sensing by changing the output signal. Such environmental effects may include for example change in temperature and changes in electromagnetic properties of the sensor system itself.

According to a first aspect of the present invention, there is provided a sensor system for sensing the contents of a bore, the sensor system comprising:

plural coils disposed behind a non-metallic lining for the bore and arranged facing the bore to generate an electromagnetic field extending through the lining laterally into the bore;

an oscillator circuit arranged to drive electrical oscillations in the coils for causing the coils to generate oscillating electromagnetic fields; and a detection circuit arranged to output signals from each coil representing a parameter of the electrical oscillations that depends on the contents of the bore, wherein the plural coils include at least one primary coil and at least one secondary coil arranged such that the oscillating electromagnetic field generated by the at least one secondary coil has a lesser degree of interaction with the contents of bore than the oscillating electromagnetic field generated by the at least one primary coil; and the sensor system is arranged to compensate the output signal from the at least one primary coil for environmental effects using the output signal from the at least one secondary coil.

Thus, the sensor system uses the secondary coil in addition to the primary coil. The secondary coil is subject to the same environmental effects as the primary coil and so provides an output signal that varies with environmental effects in a similar manner to the primary coil. However, as the oscillating electromagnetic field generated by a secondary coil has a lesser degree of interaction with the contents of bore than the oscillating electromagnetic field generated by a primary coil, the output signal from the secondary coil is dependent to a lesser degree on the contents of the bore being sensed. As a result, the output signal from the secondary coil may be used to provide compensation for environmental effects, without masking the dependence of the output signal from the primary coil on the properties that it is desired to sense.

Typically, to provide a lesser degree of interaction with the contents of bore, the secondary coil has a smaller area than the primary coil. Advantageously, in order to limit the reduction in the sensitivity of detection, the relative degree of degree of interaction with the contents of bore of the secondary coil is reduced. Typically, the secondary coil has an area no more than 25% of the area of the at least one primary coil.

The sensor system may be arranged to compensate the output signal from the at least one primary coil for environmental effects by subtracting the output signal from the at least one secondary coil therefrom. However, the compensation may also be applied in other ways, for example by dividing the output signal from the at least one primary coil by the output signal from the at least one secondary coil.

The sensor system may further comprise a processing circuit arranged to derive a measure of the contents of the bore, for example a measure of the position of an object in the bore and/or a measure of the material properties of the contents of the bore, from the compensated output signals from the primary coils. The compensation of the output signal from the at least one primary coil for environmental effects using the output signal from the at least one secondary coil may be performed in the processing circuit, or by circuitry prior to input of the output signals to the processing circuit.

According to a second aspect of the present invention, there is provided a method of sensing the contents of a bore which corresponds to the operation of the sensor system of the first aspect of the present invention.

BRIEF DESCRIPTION OF THE DRAWINGS

Embodiments of the present invention will now be described by way of non-limitative example with reference to the accompanying drawings, in which.

DETAILED DESCRIPTION

Figure 1:
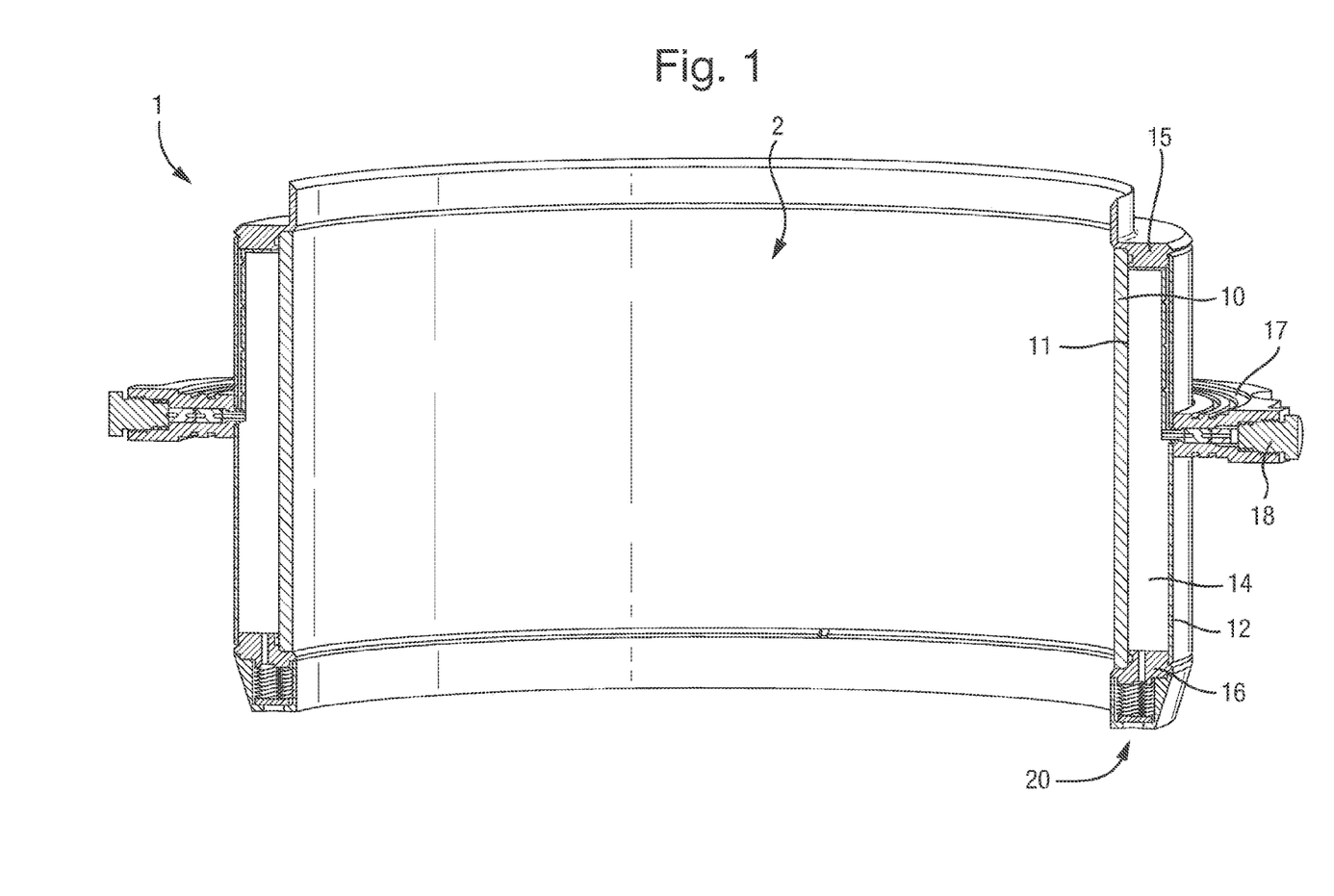
FIG. 1 is a cut-away perspective view of a sensor insert.

FIG. 1 illustrates a sensor insert 1 that is an example of a sensor system. The sensor insert 1 is configured for insertion into a bore 2 used in oil and gas extraction or production. When so inserted, the sensor insert 1 lines part of the bore 2. The bore 2 may be a pipe bore, riser or flowline, or downhole. The bore 2 may be a casing, production tubing or a well bore in an 'open-hole' well. More generally, the sensor insert 1 may be applied to a bore in any type of pipe, tube or conduit, which may or may not be applied in an oil and gas application.

Figure 2:
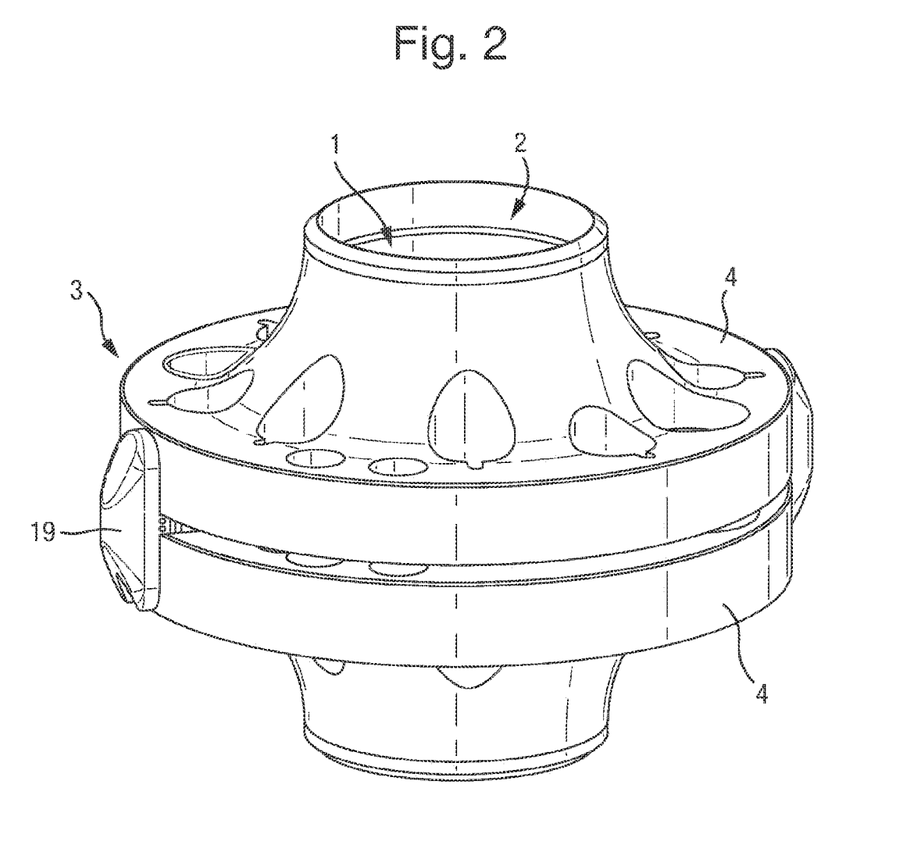
FIG. 2 is a perspective view of a joint assembly in which the sensor unit may be inserted.

In this specific example, the sensor insert 1 is configured to form a sealing insert for a joint assembly 3 as shown in FIG. 2 for connecting two sections of a tube (not themselves shown) defining the bore 2. The joint assembly 3 comprises two flanges 4 which are connected together. The sealing insert 1 is inserted inside the joint assembly 3 extending across the boundary between the two flanges 4 to provide sealing therebetween.

Configuring the sensor insert 1 to form a sealing insert for a joint assembly 3 has the advantage of allowing the sensor system 1 to be quickly and easily implemented, simply by replacing the existing seal.

However, the sensor insert could equally be configured as an insert for any other part of the bore 2, for example to be inserted into a section of a tube forming the bore 2. In general terms, the sensor insert 1 may be inserted in any location inside the bore 2, including for example inside a riser or between a BOP stack and a riser, or inside a BOP stack. Such a sensor insert 1 may be mounted at multiple locations, for example at riser flanges, riser adapters and within the BOP stack itself. For ease of deployment, such a sensor insert 1 may be constructed in a format that corresponds to the dimensions of an industry-standard insert so that it can be conveniently mounted inside risers, riser adapters, flanges or BOPs, allowing for easy and quick retro-fitting to existing risers and BOPs in the field.

The sensor insert 1 is arranged as follows.

The sensor insert 1 comprises a tubular wall 10 which is arranged as the innermost component of the sensor insert 1. The tubular wall forms a lining for the bore 2.

Figure 3:
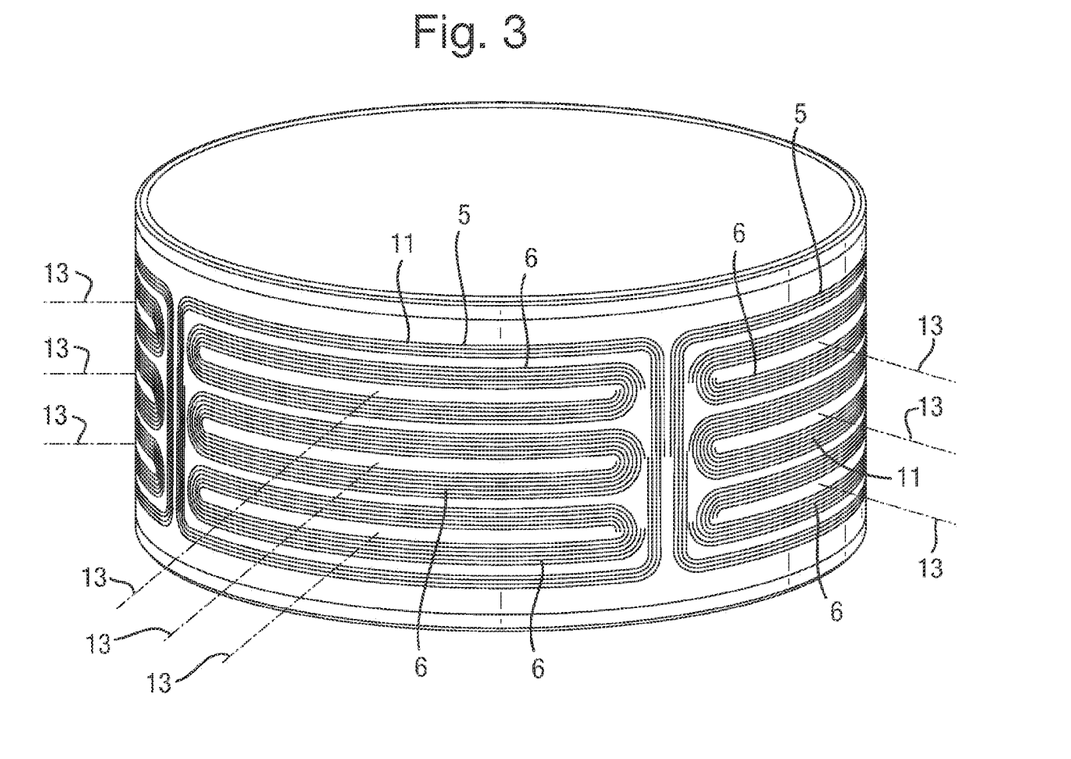
FIG. 3 is a perspective view of a tubular wall of the sensor insert.

As shown in FIG. 3, a plurality of sensing coils 11 are supported by the tubular wall 10. In the example shown in FIG. 3, the coils 11 are fixed to the outer surface of the tubular wall 10. In that manner, the coils 11 are arranged behind the inner surface of the tubular wall 10 that faces the bore 2, and hence the tubular wall 10 electrically isolates and protects the coils 11 from the fluid within the bore 2. This is important due to the fluids within the bore 2 typically including various components which may prevent electrical operation and/or damage the coils 11, for example particles, debris, corrosive components, conductive components, etc.

However, this manner of support of the coils 11 on the tubular wall 10 is not essential, and the coils 11 may instead be embedded within the tubular wall 10, provided that they are behind the inner surface of the tubular wall 10 for electrical isolation and protection. The coils 11 may be embedded within the tubular wall 10 using any suitable technique, for example most simply by initially forming the coils 11 on an outer surface of the tubular wall 10 and then adding an outer layer to the tubular wall 10 outside the coils 11.

The coils 11 are at each arranged at different angular positions around the bore 2.

Each coil 11 is formed by multiple conductive turns. The turns of each coil 11 face the inner surface of the tubular wall 10. That is, in each coil 11 the turns are wound around a notional winding axis 13 that is directed laterally into the bore 2, perpendicular to the inner surface of the tubular wall 10. Thus, the coils 11 conform to the inner surface of the bore 2. As a result, the coils 11 each generate an EM field directed laterally into the bore 2. The EM field therefore interacts with the contents of the bore to provide sensing.

The tubular wall 10 is formed from a non-conductive material in order to allows the EM field generated by the coils 11 to penetrate laterally into the bore 2. The material of the tubular wall 10 is chosen having regard to the functions of protecting the coils 11 and allowing penetration of the EM field. The material of the tubular wall 10 is also selected to be chemically compatible (inert) both with fluids typically encountered within the bore 2 and the liquid within the cavity described below. A wide range of materials are possible. The material may be a plastic, for example polyether ether ketone (PEEK), or an elastomer, for example a rubber. The material may be a composite, such as carbon fiber or fiber glass. The material may be of a type known to be suitable for use as a lining of a bore 2 in oil and gas applications. Suitable materials include, without limitation: PEEK, PTFE (Polytetrafluoroethylene), FFKM (Perfluoroelastomer), polyisoprene, styrene butadiene rubber, ethylene propylene diene monomer rubber, polychloroprene rubber, chlorosulphonated polyethylene rubber, 'Viton' or nitrile butadiene rubber. The material may also be single material or a mixture.

The tubular wall 10 may be a single piece of material or may have a layered construction of multiple layers.

PEEK is a particularly advantageous material for the tubular wall 10 due to its high levels of chemical compatibility, high temperature performance and wide level of acceptance within the oil and gas markets.

The coils 11 are formed on the tubular wall 10 in any suitable manner, including without limitation the following. The coils 11 may be printed or etched onto a surface of the tubular wall 10. The coils may be formed in grooves formed in the surface of the tubular wall 10. The coils 11 may be formed on flexible PCB attached to the tubular wall 10.

In another construction, the coils 11 may be formed from wire or sheet metal fixed to the tubular wall 10. In that case, the coils 11 may be any suitable conductive material such as stainless steel, copper or Inconel.

In the example shown in FIG. 3, the coils 11 are spiral coils in which the turns are arranged in a common plane at different distances from the winding axis 13. As an alternative, the coils 11 may be formed as a planar coil formed by a stack of planar conductive sheets.

The coils 11 include primary coils 5 and secondary coils 6, each having the same construction as discussed above, but differently shaped to provide a different interaction with the contents of the bore 2, as will now be described.

The primary coils 5 are intended to be the primary sensing element for the contents of the bore 2, and are shaped accordingly. The shape and size of the primary coils 5 is chosen to maximize their sensitivity to the properties being sensed.

Along the axis of the bore 2, the axial height of the primary coils 5 may be maximized to increase the sensitivity, within the space available in the location where the sensor insert 1 is inserted. Where the intention is to sense feature of an object in the bore 2, for example a joint section of an elongate object, then the axial height of the primary coils 5 may be approximately equal to the axial height of the feature. Within a given limit of the axial height, the primary coils 5 may have a rectangular or alternative shape.

Around the bore 2, plural primary coils 5 may be provided to sense the lateral position of an object in the bore 2. In that case, where sensing of the lateral position in two dimensions is desired, then at least three primary coils 5 may be provided, four primary coils being advantageous in order simplify the analysis of the output signals.

In the example shown in FIG. 3, there are a total of four identically shaped, rectangular primary coils 5 with equal angular spacing around the axis of the bore 2. However, this is merely by way of example. In general, there may be any number of one or more primary coils 5 and the primary coils 5 may have any other shape and/or configuration, or in general any arrangement. By way of example, the primary coils 5 may be shaped in any of the configurations of the coils disclosed in WO-2016/174439 to which reference is made for further details, and which is incorporated herein by reference.

The primary coils 5 may have the construction disclosed in WO-2009/147385, which is incorporated herein by reference, so that they include for example features, discontinuities or notches that improve resolution when detecting the position of an object while also improving sensor stability and contracting drift and other environmental effects.

The secondary coils 6 are arranged so that the oscillating electromagnetic field generated by them has a lesser degree of interaction with the contents of the bore 2 than the oscillating electromagnetic field generated by the primary coils 5. This may be achieved by the secondary coils 6 having a smaller area than the primary coils 5. In the example shown in FIG. 3, the secondary coils 6 have a similar width around the axis of the bore to the primary coils 5. In that case, the secondary coils 6 have a smaller height along the axis of the bore 2 than the primary coils 5, in order that the secondary coils 6 have a smaller area than the primary coils 5.

In the example shown in FIG. 3, the secondary coils 6 have the following arrangement with respect to the primary coils 5. There are three secondary coils 6 in respect of each primary coil 5, at a corresponding angular position, but in general there could be any number of one or more secondary coils 6 in respect of each primary coil 5. Each secondary coil 6 overlaps a primary coil 5, being entirely inside the respective primary coil 5 which allows the secondary coils 6 to be provide in the same annular plane as the primary coil 5. Further discussion of the length, number of turns, inductance and capacitance of the secondary coils 6 is given below. However, this is merely by way of example. In general, there may be any number of the secondary coils 6 and the secondary coils 6 may have any other shape and/or configuration, or in general in any arrangement. By way of example, the secondary coils 6 may be shaped in any of the configurations of the coils disclosed in WO-2016/174439 to which reference is made for further details.

The remainder of the sensor insert 1 is arranged as follows.

In addition, the sensor insert 1 comprises a tubular shield 12 arranged outside the tubular wall 10 and therefore outside the coils 11. The tubular shield 12 is made of conductive material and thereby provides a reference plane for the coils 11. This allows the coils 11 to interact with and sense the contents of the bore 2 without influence from material or components outside the bore 2.

It is desirable to separate the coils 11 from the tubular shield 12 so far as is possible within the constraints of the location of the sensor insert 1 in the bore 2 to reduce the influence of the tubular shield on the EM field generated by the coils 11. Typically, it a separation of 50 mm or more may provide the most sensitive sensing, but that may be unachievable. In many locations, the sensor insert 1 may have a maximum overall thickness less than 50 mm, for example say 30 mm. In such cases, the separation between the coils 11 and the tubular shield 12 may be in a range of 10 mm to 25 mm, which provides reduced, but adequate, sensitivity.

The tubular shield 12 may be made of any suitable conductive material, typically a metal.

The sensor insert 1 also include an annular flange 17 protruding radially outwardly from the outside of the tubular shield 12. The annular flange 17 fits with the flanges 4 of the joint assembly 3 to assist with sealing.

The sensor insert 1 comprises an annular cavity 14 disposed between the tubular wall 10 and the tubular shield 12. The cavity 14 is formed by the sensor insert 1 including a first annular cap 15 (uppermost in FIG. 1) and a second annular cap 16 (lowermost in FIG. 1) each connected to both the annular wall 10 and the annular shield 12 and holding them spaced apart to define the cavity 14 therebetween. Thus, the first annular cap 15 and the second annular cap 16 form the annular ends of the cavity 14. The thickness of the cavity 14 (together with the location of the coils 11 within the tubular wall 10 if the coils 11 are embedded) therefore defines the separation between the coils 11 and the tubular shield 12.

The annular cavity 14 contains a liquid, and the sensor insert 1 is provided with a pressure balancing unit 20 arranged to balance the pressure of the liquid within the annular cavity 14 with the pressure of the fluid in the bore 2. Further details of the liquid and the pressure balancing unit 20 are described in the co-owned British Patent Application filed on the same day as this application entitled "Bore Sensor Insert" (J A Kemp ref: N401316 GB). Additionally, the cavity 14 may be provided with one or more pressure relief valves to allow liquid therewithin to exhaust from the cavity 14 should undesired thermal expansion occur.

The electrical arrangement of the sensor insert 1 is as follows.

The annular flange 17 has sockets 18 which are electrically connected to the coils 11. An electrical circuit 40 is housed in housings 19 provided outside the tubular shield 20 on the outside of the joint assembly 3. The electrical circuit 40 is connected to the sockets 18 for making an electrical connection to the coils 11.

Figure 4:
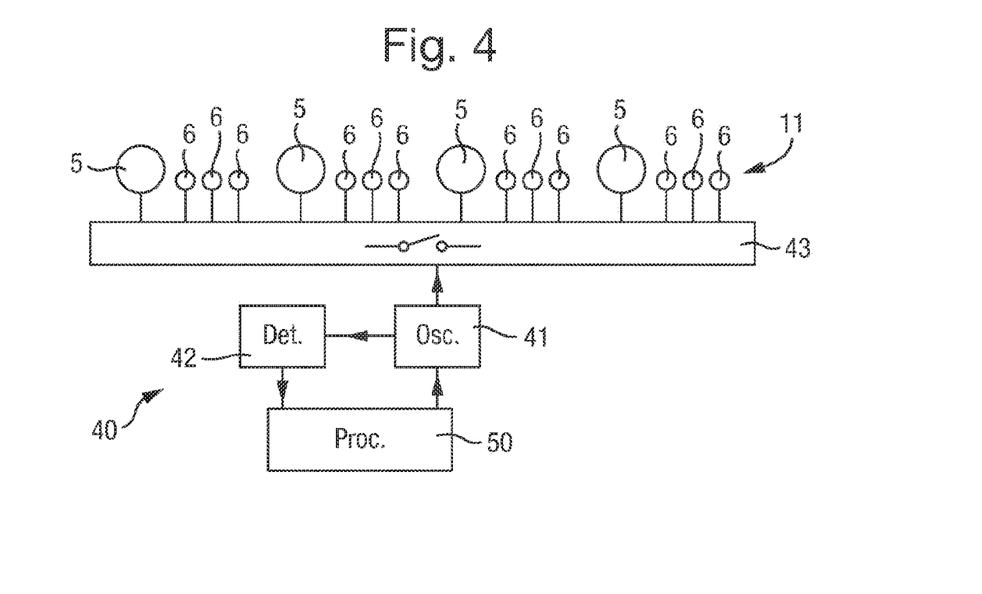
FIG. 4 is a diagram of an electrical circuit connected to the coils.

The electrical circuit 40 is arranged as shown in FIG. 4 and includes an oscillator circuit 41 and a detection circuit 42 which may be implemented on a common circuit board.

The electrical circuit 40 also includes a switch arrangement 43 arranged to connect the oscillator circuit 41 selectively to any one of the coils 11. The oscillator circuit 41 drives electrical oscillations in the coil 11 to which it is connected. In use, the switch arrangement 43 is switched to connect the oscillator circuit 41 to each respective coil 11 in turn. The electrical oscillations in the coils 11 cause the coils 11 to produce oscillating EM fields that, due to arrangement of the coils described above, interact with the contents of the bore 2.

The oscillator circuit 41 and the coils 11 are designed to drive electrical oscillations that are radio frequency (RF) electrical oscillations. In general, the electrical oscillation may be any radio frequency, which as used herein, may in general be considered to be a frequency within the range from 3 kHz to 300 GHz.

Increasing the frequency of the electrical oscillation increases the sensitivity, for which reason the frequency may typically be at least 10 kHz. Typically, the frequency of the drive signal may be at most 100 MHz or at most 1 GHz, as higher frequencies may require more complicated electronics.

The detection circuit 42 is arranged to detect one or more parameters of the electrical oscillations that is dependent on the interaction of the EM field generated by the coil 11 currently being driven with contents of the bore 2. The detection circuit 42 outputs output signal representing the one or more detected parameters. Parameters which may be detected by the detection circuit 42 include, without limitation, the frequency, the amplitude or Q factor of the electrical oscillations. Different parameters may be used to sense different aspects of the contents of the bore 2.

In general, the oscillator circuit 41 may be of any type but particular advantage is achieved by the oscillator circuit 41 being a marginal oscillator. A marginal oscillator provides high stability and sensitivity. The oscillator circuit 41 and the detection circuit 42 may be configured as described in more detail in WO-2016/174439 to which reference is made.

Alternatively, the oscillator circuit 41 may have the construction disclosed in WO-2015/015150 to which reference is made for further details, and which is incorporated herein by reference.

The electrical circuit 40 also includes a processing circuit 50 that is supplied with a the output signals from the detection circuit 42. The processing circuit 50 analyses the one or more detected parameters of the electrical oscillations. The processing circuit 50 may be any form of circuit that is capable of performing such an analysis, for example a dedicated hardware or a microprocessor running an appropriate program.

The processing circuit 50 also controls the operation of the oscillator circuit 41 and the switching of the switch arrangement 43 to connect the oscillator circuit 41 to each respective coil 11 in turn. This allows polling of the coils 11 over time. That is, as the switching occurs, the processing circuit 50 is supplied by the detection circuit 42 with the output signals from each respective coil 11 in turn.

The processing circuit 50 processes the one or more detected parameters from all coils 11 to provide one or more measures of the contents of the bore 2, examples of which are described below.

First, the processing circuit 50 compensates the output signal from each primary coil 5 for environmental effects using the output signal from one of the corresponding secondary coils 6, or each of the three corresponding secondary coils 6 in combination.

The basis of the compensation is as follows.

The output signals from each sensing coil 11 will vary (a) with the property being sensed, for example the position of an object in the bore 2 or the material properties of the contents of the bore 2 of interest, and (b) as the environment around the coils changes. Examples of the environmental effect are changes in the temperature of the coils 11 which cause changes in the dimensions of the coils 11, and changes in the dielectric properties of the material surrounding the coils 11, for example the material of the tubular wall 10 and the liquid contained in the cavity 14. Where the property being sensed is the position of an object in the bore 2, another example of an environmental effect is a change in the dielectric properties of the fluid passing through the bore 2.

The variance (a) with the property being sensed is relied on to derive a measure of that property, but that may be masked to some extent by the environmental effects (b) causes the output signals to change in an unpredictable manner due by causing a change in the inductance of the coils 11 (e.g. due to the change in the coil dimensions) and/or a change in the capacitance of the coils 11 (e.g. due to the dielectric changes). In this manner, the environmental effects (b) may cause erroneous values to be derived for the measures of the property being sensed. This is tackled by the compensation of the output signal from the primary coils 5 using the output signals from the corresponding secondary coils 6, as follows.

As the secondary coils 6 are configured so that the oscillating electromagnetic field generated thereby has a lesser degree of interaction with the contents of bore 2 than the oscillating electromagnetic field generated by the primary coils 5, the output signals from the secondary coils 6 are dependent to a lesser degree on the contents of the bore being sensed than the output signals from the primary coils 5, but remain dependent on the environmental effects (b). Thus, the compensation may be performed by a simple mathematical operation on the output signals from the primary coils 5 and secondary coils 6 that removes reduces the dependence of the output signal from the primary coil 5 on the environmental effect (b). Most simply, the compensation is performed by subtracting the output signal from a secondary coil 6 (or a combined output signal from plural secondary coils 6) from the output signal from a primary coil 5. Alternatively, other mathematical operations may be performed, for example dividing the output signal from a primary coil 5 by the output signal from a secondary coil 6 (or a combined output signal from plural secondary coils 6).

The compensation is advantageously performed by compensating the output signal from a primary coil 5 using the output signals from the or each corresponding secondary coil 6 which are physically located close to the primary coil 5 and so subject to the most similar environmental effects. However, in general that is not essential as in practice the environmental effects may be quite similar in the overall vicinity of the sensor insert 1, so the compensation may alternatively be performed using any secondary coil 6 or any combination of secondary coils 6.

The compensation is now discussed further with reference to the example of using compensating the output signal $S_P$ from a primary coil 5 by subtracting the output signal $S_S$ from a secondary coil 6 to derive a compensated output signal $S_C$ from a primary coil 5, i.e. $S_C = S_P - S_S$, although without implying limitation to that.

As the output signal $S_S$ from the secondary coil 6 is less sensitive to the property of the contents of the bore 2 being sensed, but is sensitive to the environmental effects, the compensated output signal $S_C$ remains sensitive to the property of the contents of the bore 2 being sensed but is less dependent on the environmental effects that could otherwise cause an error in the derived measure of the property of the contents of the bore 2.

The following considerations arise.

To reduce the sensitivity of the secondary coil 6 to the property of the contents of the bore 2 being sensed, the secondary coil 6 has a smaller area than the primary coil 5. Where the secondary coil 6 is arranged at a corresponding angular position to the primary coil 5, this may be achieved by the secondary coil 6 having a smaller axial height along the axis of the bore than the primary coil 5.

Figure 5:
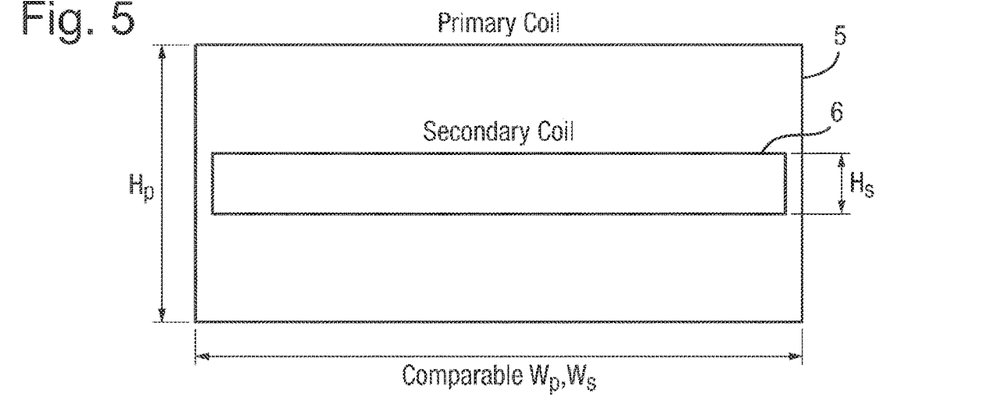
FIG. 5 is a schematic view of a primary coil and a secondary coil.

For example, in the example shown in FIG. 5 where the primary coil 5 and the secondary coil 6 are rectangular in shape (showing for clarity the outlines of the shape of the coils 11 but not the individual turns thereof), the primary coil 5 and the secondary coil 6 have respective widths $W_P$ and $W_S$ that are similar, but the secondary coil 5 has an axial height $H_S$ that is smaller than the height $H_P$ of the primary coil 5. This is because the sensitivity of a coil 11 depends on the area of the coil 11 that is overlapped by the target.

Considering the case of sensing an object in the bore 2, the sensitivity may be considered as follows where the width $W_S$ of the secondary coil 6 is made comparable with the width $W_P$ of the primary coil 5 in order to maintain the coverage around the circumference of the bore 2. In the presence of the object, the output signal $S_S$ from the secondary coil 6 will be smaller than the output signal $S_P$ from the primary coil 5, by the ratio of the heights $H_S$ and $H_P$ of the secondary coil 6 and primary coil 5 respectively, i.e. $S_S = S_P \cdot (H_S/H_P)$. The compensated out signal $S_C$ is then given by $S_C = S_P \cdot (1 - H_S/H_P)$. Ideally, the ratio of the areas of the secondary coil 6 and the primary coil should be reduced, for example by reducing the ratio of the heights $H_S/H_P$, in order to minimize the reduction in the sensitivity to the object being sensed. To achieve this, the secondary coil 6 typically has an area no more than 25% of the area of the primary coil 5.

The secondary coil 6 is configured to respond to the environmental effects in the same manner as the primary coil 5, so far as possible. To achieve this, the following considerations apply.

To match the responses of the secondary coil 6 and the primary coil 5, the secondary coil 6 is designed so that its resistance, inductance and capacitance are as close as possible to that of the primary coil 5. Desirably, the resistance of the secondary coil 6 is within 50%, preferably 25%, more preferably 10%, of the resistance of the primary coil 5. Desirably, the capacitance of the secondary coil 6 is within 50%, preferably 25%, more preferably 10%, of the capacitance of the primary coil 5. Desirably, the inductance of the secondary coil 6 is within 50%, preferably 25%, more preferably 10%, of the inductance of the primary coil 5.

The resistance of each coil 11 is affected by the total length of the turns of the coil 11 and the cross-sectional area of the turns of the coil 11. For ease of manufacture, the turns of the secondary coil 6 advantageously have the same, or similar, cross-sectional area of the turns of the primary coil 5. Desirably, total length of the turns of the secondary coil 6 is within 50%, preferably 25%, more preferably 10%, of the total length of the turns of the primary coil 5.

The inductance of each coil 11 is affected by the area of the coil 11 and the total length of the turns of the coil 11.

As the secondary coil 6 is of a smaller area than the primary coil 5, then typically the secondary coil 6 has a larger number of turns than the primary coil 5.

The capacitance of each coil 11 is affected by the spacing between the turns of the coil 11. Desirably, the spacing between the turns of the secondary coil 6 is the same as the spacing between the turns of the primary coil 5.

For example, a possible process to design the secondary coil 6 may be as follows:

(a) Fix the height $H_P$, width $W_P$ and number of turns $N_P$ of the primary coil 5. This determines the total length $L_P$ of the turns of the primary coil 5.

(b) Fix the width $W_S$ of the secondary coil 6 to be as large as possible subject to the constraint that the secondary coil 6 lies within the confines of the primary coil 5. The width $W_S$ of the secondary coil 5 will be similar, albeit slightly smaller than, the width $W_P$ of the primary coil 5.

(c) Choose the height $H_S$ and number of turns $N_S$ of the secondary coil 6 so that the total length Ls of the turns of the secondary coil 6 is similar to the total length $L_P$ of the turns of the primary coil 5 and the inductance of the secondary coil 6 is similar to the inductance of the primary coil 5, setting the separation between the turns of each of the primary coil 5 and secondary coil 6 to be the same.

While complete balancing of the resistance, inductance and capacitance of the secondary coil 6 and the primary coil 5 might not be possible, in practice sufficient balancing may be achieved to provide a useful compensatory effect.

The following experimental data has been derived for a primary coil 5 and a secondary coil 6 wherein $W_P \sim 400$ mm, $W_S \sim 350$ mm, $H_P \sim 200$ mm, $H_S \sim 50$ mm, $N_P = 4$, and $N_S = 7$ for use with a bore 2 of diameter~125 mm. The output signal S in this example is the frequency of the oscillations, and may be represented taken as the change in resonance frequency F caused by the presence of an elongate object at separation distance r, for example given by:

$$S = (F(r) - F(r=\infty))/F(r=\infty)$$

Figure 6:
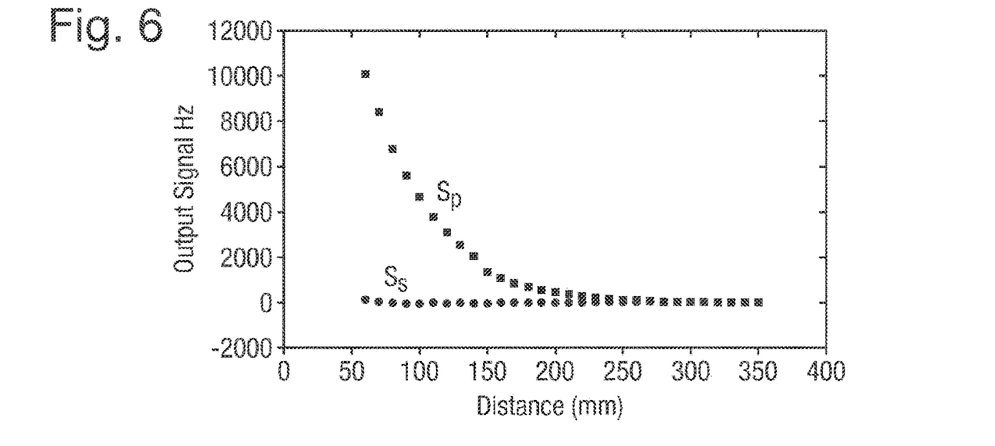
FIG. 6 is a graph of output signals from the primary coil and the secondary coil when an object is present against the distance of the object from the coils.

FIG. 6 shows output signal $S_P$ from the primary coil 5 and the output signal $S_S$ from the secondary coil 6 as a function of the separation distance r. As can be seen, in this example the output signal $S_P$ from the primary coil 5 rapidly increases as the separation distance r reduces, while the output signal $S_S$ from the secondary coil 6 is virtually insensitive to the separation distance r.

Figure 7:
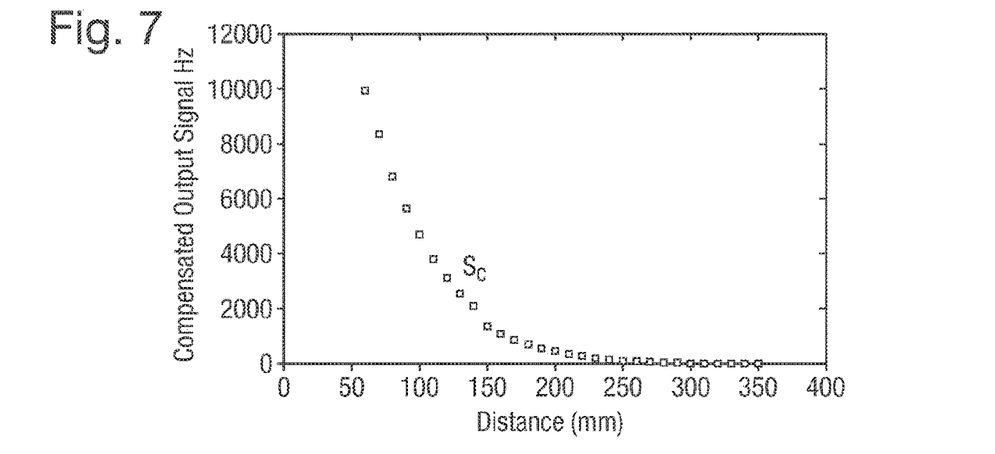
FIG. 7 is a graph of the subtracted output signals of FIG. 6.

FIG. 7 shows the compensated output signal $S_C$ given by $S_C = (S_P - S_S)$ as a function of the separation distance r. This compensated output signal $S_C$ varies with the separation distance r and so can be used to derive a measure of the separation distance r.

Figure 8:
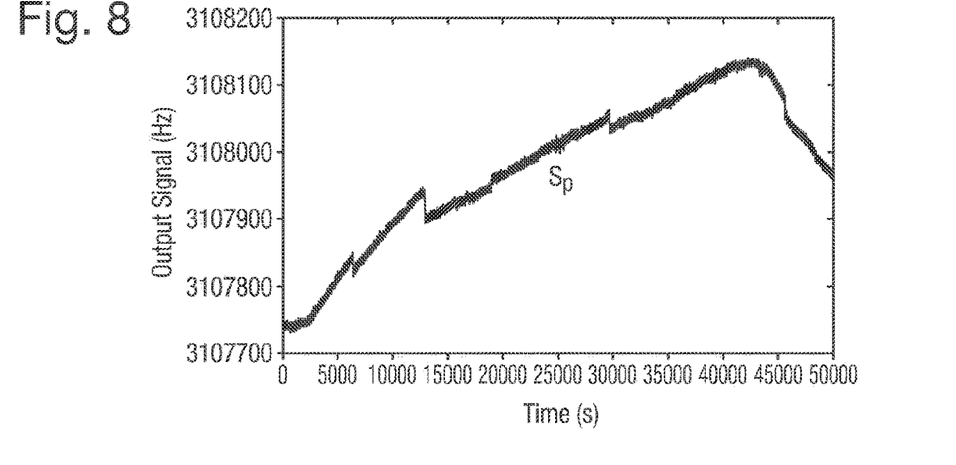
FIGS. 8 and 9 are graphs of output signals from the primary coil and the secondary coil respectively measured experimentally over a period of time.
Figure 9:
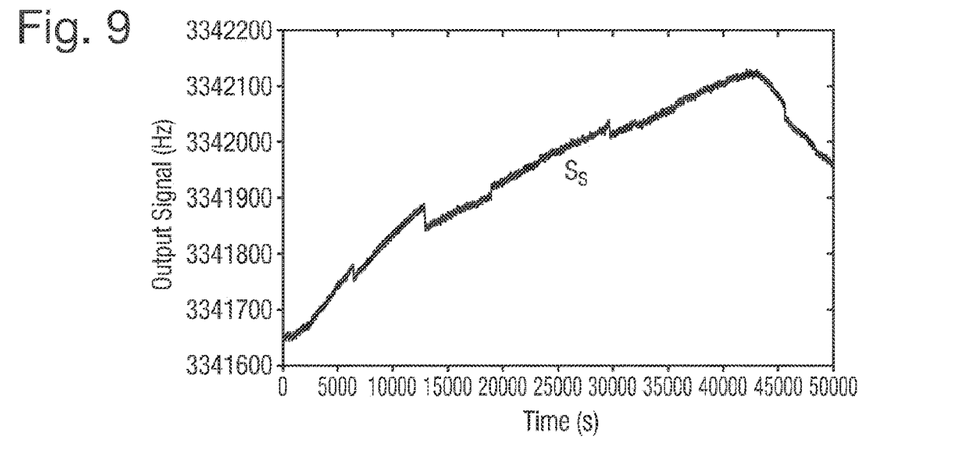
Figure 10:
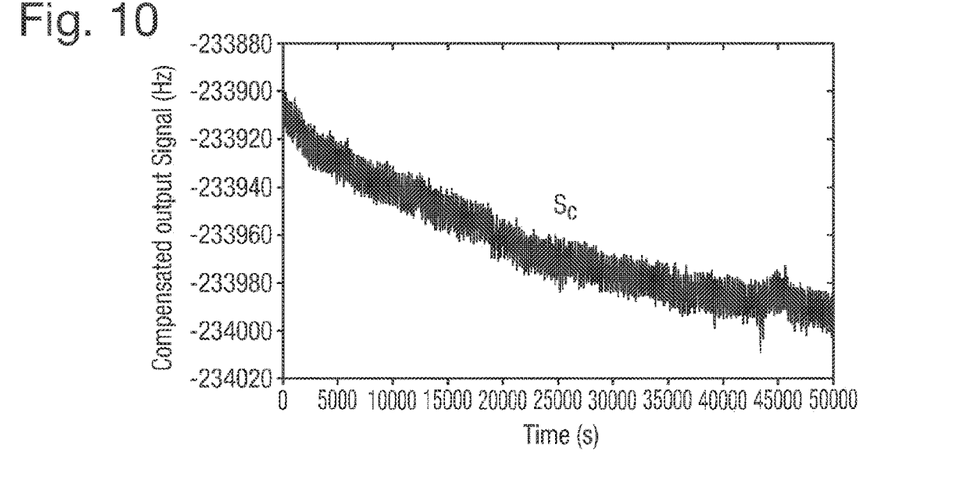
FIG. 10 is a graph of the subtracted output signals of FIGS. 8 and 9.

Compensation for the environmental effect of temperature change was studied as follows. The output signal $S_P$ from the primary coil 5 and the output signal $S_S$ from the secondary coil 6 were logged overnight as the temperature in the laboratory fluctuated. FIGS. 8 and 9 show the results. As can be seen, the output signal $S_P$ from the primary coil 5 and the output signal $S_S$ from the secondary coil 6 had a similar dependence on the temperature which varied over time. FIG. 10 shows the shows the compensated output signal $S_C$ derived from the results in FIGS. 8 and 9. As can be seen the compensated output signal $S_C$ has a much reduced variation with temperature.

Although it is described above that the compensation of the output signals from the primary coils 5 for environmental effects is performed in the processing circuit 50, as an alternative the compensation may be alternatively be performed, by circuitry prior to input of the output signals from the coils 11 to the processing circuit 50. For example, the output signals from the coils 11 that are generated in turn may be buffered and then the output signals from the corresponding primary coils 5 and secondary coils 6 may be supplied to a circuit which performs a subtraction (or other mathematical operation) to compensate the output signals from the primary coils 5.

The processing circuit 50 may output a measure of position of an object within the bore 2. For deriving such a measure, a parameter which is detected and used may be the frequency of the oscillations. This will depend on the position of the object within the bore 2. In typical oil and gas applications, frequency shifts caused by the movement of an object in the bore are virtually unaffected by any fluctuations in the composition of the fluid in the bore 2. However, other parameters may alternatively be used.

For example, in some applications the object may be an elongate component in the bore 2. In an oil and gas application, the elongate component may be a drill string comprising a series of drill pipes connected by joint sections, a drill casing connected by a plurality of joint sections, tubing or tooling. For example, the elongate component, and sensed features thereof, may be any of: a section or 'stand' of drill pipe, pipe joint, tubulars, drilling tool, tool joint, casing, casing collar, logging tool, logging tool, cabling, wireline, electric line, slickline, logging while drilling (LWD) tools or measuring while drilling (MWD) tools, cameras, debris, wrenches or spanners, jars or jarring equipment, pigs or pigging devices, production tubing, perforators or perforation equipment, coiled tubing, hosing, umbilical, composite piping or tubing, well intervention tubing, cutting tools, fishing equipment or well intervention equipment.

In that case, the processing circuit 50 may output a measure of the lateral position within the bore 2 of the elongate component and/or a measure of the axial position within the bore 2 of a feature of the elongate component, for example a joint section. Generally the feature whose axial position is detected may be any element having a different interaction with the EM field of the coils from the remainder of elongate component. Typically, the feature will be an element having a different external shape from the remainder of elongate component.

More generally, the sensor insert 1 can be used to locate elongate components in any vertical or horizontal infrastructure used during drilling, exploration and production of hydrocarbons including but not limited to pressure control equipment, blow out preventer (BOP), BOP stack, Christmas trees (x-trees), subsea x-trees, 'dry' x-trees, horizontal or vertical x-trees, risers, flexible risers, articulated risers, well intervention systems, well caps, containment domes, seal-subs, riser adapters, composite risers, umbilical, casing, tubing, piping, flanges, production or injection flowlines, pipelines, pipeline networks, manifolds, separators, pumps, compressors, mouseholes, moon pools, jars and fingerboards.

The processing circuit 50 may derive such measures in the manner disclosed in WO-2016/174439, to which reference is made for further details.

In this case, the measures output by the processing circuit 50 may be used to control a BOP apparatus that operates shear rams in an emergency to cut through the elongate component with the intention of sealing the bore 2 and hence a well in which the BOP apparatus 2 is employed.

The processing circuit 50 may output a measure of material properties of the contents of the bore 2 in a region adjacent to the coil 11 from which an output signal is currently derived. The measures of material properties derived by the processing circuit 50 may be of various different types, depending on the nature of the contents of the bore 2 and the EM properties of interest. By way of non-limitative example, the measures of EM properties may be those described in WO-2012/007718, WO-2015/015150 or GB-2,490,685. The processing circuit 50 may derive such measures in the manner disclosed in WO-2016/174439, to which reference is made for further details.

For example, in the case of the contents being a slurry, or a fluid with particulate or solid matter, the derived EM properties may be used to discriminate between the solid, water and oil content of a flowing matrix such as waste, brine, drilling cuttings, metallic particulate (in the case of lubrication or hydraulic fluid), mining waste, soil, plant matter (in the case of a fermentation process or biomass) or sewage.

The invention claimed is:

1. A sensor system for sensing the contents of a bore, the sensor system comprising:
   plural coils disposed behind a non-metallic lining defining the bore and arranged around the non-metallic lining to generate an electromagnetic field extending through the non-metallic lining laterally into the bore;
   an oscillator circuit arranged to drive electrical oscillations in the coils for causing the coils to generate oscillating electromagnetic fields; and
   a detection circuit arranged to output signals from each coil representing a parameter of the electrical oscillations that depends on the contents of the bore,
   wherein
   the plural coils include at least one primary coil and at least one secondary coil wherein the at least one secondary coil is arranged inside of its associated primary coil such that the oscillating electromagnetic field generated by the at least one secondary coil has a lesser degree of interaction with the contents of bore than the oscillating electromagnetic field generated by the at least one primary coil; and
   the sensor system is arranged to compensate the output signal from the at least one primary coil for environmental effects using the output signal from the at least one secondary coil.

2. A sensor system according to claim 1, wherein the at least one secondary coil has a smaller area than the at least one primary coil.

3. A sensor system according to claim 2, wherein the at least one secondary coil has an area no more than 25% of the area of the at least one primary coil.

4. A sensor system according to claim 1, wherein the at least one secondary coil has a smaller height along the axis of the bore than the at least one primary coil.

5. A sensor system according to claim 1, wherein the plural coils include plural primary coils and plural secondary coils.

6. A sensor system according to claim 5, wherein the plural coils comprise at least one secondary coil in respect of each primary coil.

7. A sensor system according to claim 6, wherein each secondary coil overlaps a primary coil.

8. A sensor system according to claim 5, wherein the plural primary coils include primary coils at different angular positions around the bore.

9. A sensor system according to claim 8, wherein the plural coils comprise at least one secondary coil in respect of each primary coil at a corresponding angular position.

10. A sensor system according to claim 1, wherein the at least one secondary coil has a larger number of turns than the at least one primary coil.

11. A sensor system according to claim 1, wherein the spacing between the turns of the at least one secondary coil is the same as the spacing between the turns of the at least one primary coil.

12. A sensor system according to claim 1, wherein the total length of the turns of the at least one secondary coil is within 50%, preferably 25%, more preferably 10%, of the total length of the turns of the at least one primary coil.

13. A sensor system according to claim 1, wherein the resistance of the at least one secondary coil is within 50%, preferably 25%, more preferably 10%, of the resistance of the at least one primary coil.

14. A sensor system according to claim 1, wherein the capacitance of the at least one secondary coil is within 50%, preferably 25%, more preferably 10%, of the capacitance of the at least one primary coil.

15. A sensor system according to claim 1, wherein the inductance of the at least one secondary coil is within 50%, preferably 25%, more preferably 10%, of the inductance of the at least one primary coil.

16. A sensor system according to claim 1, wherein the sensor system is arranged to compensate the output signal from the at least one primary coil for environmental effects by subtracting the output signal from the at least one secondary coil therefrom.

17. A sensor system according to claim 1, wherein the sensor system further comprises a processing circuit arranged to derive a measure of the contents of the bore from the compensated output signals from the primary coils.

18. A sensor system according to claim 17, wherein the measure of the contents of the bore is a measure of the position of an object in the bore and/or a measure of the material properties of the contents of the bore.

19. A sensor system according to claim 1, wherein the bore contains an object comprises a series of elements connected by joint sections.

20. A sensor system according to claim 1, wherein the oscillator circuit is arranged to generate electrical oscillations in each respective coil in turn.

21. A sensor system according to claim 1, wherein each primary coil is identically shaped and each secondary coil is identically shaped.

22. A sensor system according to claim 1, wherein the oscillator circuit comprises a marginal oscillator circuit.

23. A sensor system according to claim 1, wherein said parameter of the electrical oscillations generated in each coil is the frequency of the electrical oscillations.

24. A sensor system according to claim 1, wherein the electrical oscillations are radio frequency electrical oscillations.

25. A method of sensing the contents of a bore using plural coils disposed in a non-metallic lining, non-metallic lining defining the bore and the plural coils disposed behind the non-metallic lining and arranged around the non-metallic lining to generate an electromagnetic field extending laterally into the bore, the method comprising:

driving electrical oscillations in the coils for generating oscillating electromagnetic fields; and generating output signals from each coil representing a parameter of the electrical oscillations that depends on the contents of the bore wherein the plural coils include at least one primary coil and at least one secondary coil, wherein the at least one secondary coil is arranged inside of its associated primary coil such that the oscillating electromagnetic field generated by the at least one secondary coil has a lesser degree of interaction with the contents of the bore than the oscillating electromagnetic field generated by the at least one secondary coil; and the method further comprises compensating the output signal from the at least one primary coil for environmental effects using the output signal from the at least one secondary coil.

* * * * *